3,376,332
PROCESS FOR THE CATALYTIC SYNTHESIS
OF METHANOL
Takashi Eguchi and Tamechika Yamamoto, Niigata-shi, Saburo Yamauchi, Tokyo, and Michio Kuraishi and Kazuo Asakawa, Niigata-shi, Japan, assignors to Japan Gas-Chemical Company, Inc., Tokyo, Japan
No Drawing. Original application Apr. 23, 1963, Ser. No. 274,946, now Patent No. 3,256,208, dated June 14, 1966. Divided and this application Feb. 17, 1966, Ser. No. 528,049
1 Claim. (Cl. 260—449.5)

This application is a division of our earlier application Ser. No. 274,946 filed Apr. 23, 1963, now Patent No. 3,256,208.

This invention is directed to the synthesis of methanol from hydrogen and carbon oxides employing Cu-Zn-Cr catalysts.

More particularly, this invention relates to methanol synthesis which employs a catalyst which is constituted by a thermally decomposed product of basic cuprammonium chromate as the copper containing component.

Catalysts conventionally employed for the synthesis of methanol from gases containing carbon oxides and hydrogen were of the Zn-Cr or Cu-Zn-Cr systems. The Zn-Cr system catalysts are excellent in heat resistance and durability but their activity is so low that it is practically impossible to use them at low temperatures. The Cu-Zn-Cr system catalysts are poor in heat resistance and durability, but excellent in activity; therefore, they are suitable for methanol synthesis at low temperatures. Various catalysts of the Cu-Zn-Cr system have been proposed relative to improvements of activity, heat resistance and durability. Relative to the starting materials, it had been considered to use copper oxide, zinc oxide, and chromic anhydride as standard catalysts.

We have found that since the conventional catalysts of this type contain a relatively large amount of copper oxide which is weak in mutual action with Zn or Cr, i.e., in the free state, insufficient activity is shown in practice. Moreover, under synthesis conditions, said copper oxide in the free state easily deposits as metallic copper and catalytic activity rapidly decreases. It is an object of the present invention to provide a catalyst, which avoids the aforesaid difficulties.

In this respect, it is a particular object of the invention to provide a process for synthesizing methanol from carbon oxides and hydrogen employing a catalyst of the above type.

Yet another object of the invention is to provide a methanol synthesis process which employs a catalyst enabling reaction conditions of relatively low temperature and low pressure.

Further objects and advantages of the invention will be understood from the description set forth hereinunder.

According to the present invention, a new type of catalyst of Cu-Zn-Cr system is provided where a thermally decomposed product of cuprammonium chromate is used as the copper component. The atomic ratio of the three elements in the present catalyst is not critical, but preferably, the ratio of Cu:Zn:Cr is about 0.4:1.2:1.0.

The present catalyst is prepared by mixing an aqueous chromic acid solution with a material obtained from the thermal decomposition of basic cuprammonium chromate and further mixing therewith a zinc oxide powder. The thermal decomposition is effected at 250°–700° C., preferably about 300° C., for about 0.5–3 hours. The zinc oxide powder may be replaced not only by an aqueous zinc oxide paste, but also by zinc hydroxide and by zinc acetate. After thoroughly kneading to form a homogeneous paste, the mixture is shaped into the form of plates of about 5–6 mm. thick, or rods of 5–6 mm. in diameter. Then they are pulverized, after drying, into a grain size of 5–6 mm. Alternatively, they may be shaped into pellets after being crushed. Then, they are reduced at 170°–450° C., preferably 230°–250° C. in the presence of the reducing gases.

The catalyst shows excellent activity which cannot be expected from conventional catalysts, even at relatively low pressure and temperature, such as at 150 kg./cm.$^2$ and 220° C. The catalyst is usable at a temperature within the range of 200°–400° C., preferably 250°–350° C. Furthermore, the present catalyst has high mechanical strength. Thus, it has been found that the use of the catalysts of the present invention completely eliminates the drawbacks of copper-containing catalysts, which have heretofore been considered low in particle strength. Also, it has been observed that the present catalysts are less exothermic than the conventional ones, during the methanol synthesis as well as in the reduction step during the manufacture thereof. Furthermore, deformation of the catalyst, i.e., powdering hardly occurs during the methanol synthesis. This is due to the fact that in the conventional catalyst produced by mixing copper oxide and zinc oxide with an aqueous chromic acid solution or by adding copper oxide to an aqueous chromic acid solution with zinc oxide added, its Cr component contains exclusively hexavalent Cr atoms before the reduction treatment. In contrast, Cr atoms present in equimolar amount with respect to copper in the catalyst of the present invention before the reduction, are trivalent, and therefore materials to be reduced per unit catalyst weight are very small in amount and reduction proceeds moderately.

The following examples show the superiority of the present catalysts in comparison with the conventional Cu-Zn-Cr catalysts composed of copper oxide, zinc oxide and chromic anhydride, in the synthesis of methanol.

EXAMPLE 1

75 g. of chromic anhydride was dissolved in 75 cc. of water. To the resulting solution, 78.2 g. of a material obtained by thermal decomposition of basic cuprammonium chromate at 300° C. for one hour was added and the resultant product was kneaded for one hour. To the thus obtained material, 122.2 g. of zinc oxide which has been made pasty with water was added and the resulting mixture was kneaded for one hour to form a homogeneous paste. The paste was dried at room temperature to 60° C. after being extruded through a nozzle with a diameter of 6 mm. The paste was made into the form of a plate of 5–6 mm. thickness. The dried material was pulverized to a grain size of about 6 mm. and reduced for several hours with a mixture gas of CO and $H_2$ at 230°–250° C. under atmospheric pressure.

The following table shows a comparison between the results of methanol synthesis carried out by use of the thus obtained catalyst and those of the conventional catalyst (A) prepared by dissolving copper oxide in an aqueous chromic acid solution and when adding zinc oxide thereto. (The catalyst A was prepared according to Bull. Chem. Soc., Japan, 33, 358–363 (1960).)

| Catalyst | Cu:Zn:Cr (Atomic ratio) | Synthesis conditions | | | Synthesis gas composition | | Amount of methanol produced (cc./h.g.) |
|---|---|---|---|---|---|---|---|
| | | Pressure gauge (kg./cm.$^2$) | Temperature (° C.) | Space velocity (1/hr.) | CO (percent) | H$^2$ (percent) | |
| Instant catalyst | 0.4:1.2:1.0 | 150 | 270 | 1×10$^4$ | 24 | 67 | 2.47 |
| Catalyst (A) | 0.33:1.25:1.0 | 150 | 270 | 1×10$^4$ | 24 | 68 | 1.56 |

From the above table, it is apparent that the catalyst of the present invention is high in activity per catalyst unit weight as compared with the conventional catalyst to thereby result in outstanding production of methanol.

EXAMPLE 2

Results of tests on the present catalyst comprising Cu, Zn and Cr at an atomic ratio of 0.4:1.8:1.0 are compared with those of the conventional catalysts (A), prepared by dissolving copper oxide in an aqueous chromic acid solution and then adding zinc oxide thereto, and (B), obtained by charging zinc oxide into an aqueous chromic acid solution and then adding copper oxide thereto, to give the following table. (The catalyst A was the same as in Example 1, and the catalyst B was prepared according to Japanese Patent 220,390 (1956).)

It is apparent that the catalyst of the present invention is higher in catalyst activity per unit weight than any of the conventional catalysts thereby resulting in outstanding production of methanol.

What is claimed is:
1. A process for synthesizing methanol from carbon oxides and hydrogen comprising reacting gases containing carbon oxides and hydrogen at a temperature of between 200 and 400° C. and a pressure of at least 150 kg./cm.$^2$ in the presence of a catalyst which is prepared by forming a homogeneous paste consisting essentially of basic cuprammonium chromate which has been decomposed at a temperature between 250° C. to 700° C., an aqueous solution of chromic acid and a substance selected from the group consisting of zinc oxide, zinc acetate and zinc hydroxide, drying said mixture to obtain a dried product, shaping said dried product, and reducing the thus shaped product at a temperature from 170° C. to 350° C.

| Catalyst | Cu:Zn:Cr (Atomic ratio) | Synthesis conditions | | | Synthesis gas composition | | Amount of methanol produced (cc./h.g.) |
|---|---|---|---|---|---|---|---|
| | | Pressure gauge (kg./cm.$^2$) | Temperature (° C.) | Space velocity (1/hr.) | CO (percent) | H$^2$ (percent) | |
| Instant catalyst | 0.4:1.8:1.0 | 150 | 270 | 1×10$^4$ | 25 | 66 | 2.50 |
| Catalyst (A) | 0.33:2.0:1.0 | 150 | 270 | 1×10$^4$ | 24 | 67 | 1.42 |
| Catalyst (B) | 0.55:2.0:1.0 | 150 | 270 | 1×10$^4$ | 25 | 66 | 0.81 |

References Cited

UNITED STATES PATENTS

| 1,738,989 | 12/1929 | Dreyfus | 260—449.5 |
| 1,746,782 | 2/1930 | Lazier | 252—468 |
| 2,014,883 | 9/1935 | Dodge | 260—449.5 |
| 2,061,470 | 11/1936 | Larson | 260—156 |

FOREIGN PATENTS

| 229,715 | 2/1925 | Great Britain. |
| 308,181 | 3/1929 | Great Britain. |

OTHER REFERENCES 38,130, January 1963, Japan Patent Publications, 252–468 (3 pp. spec.).

Ogino, Bulletin Chemical Society Japan (1960), vol. 33, No. 3, pp. 358–363.

Natta, Catalysis III, Chapter 8, pp. 355–356, 374–7, 402 (1955), Reinhold Publishing Co., New York.

LEON ZITVER, *Primary Examiner.*

H. MARS, *Assistant Examiner.*